Figure 7:
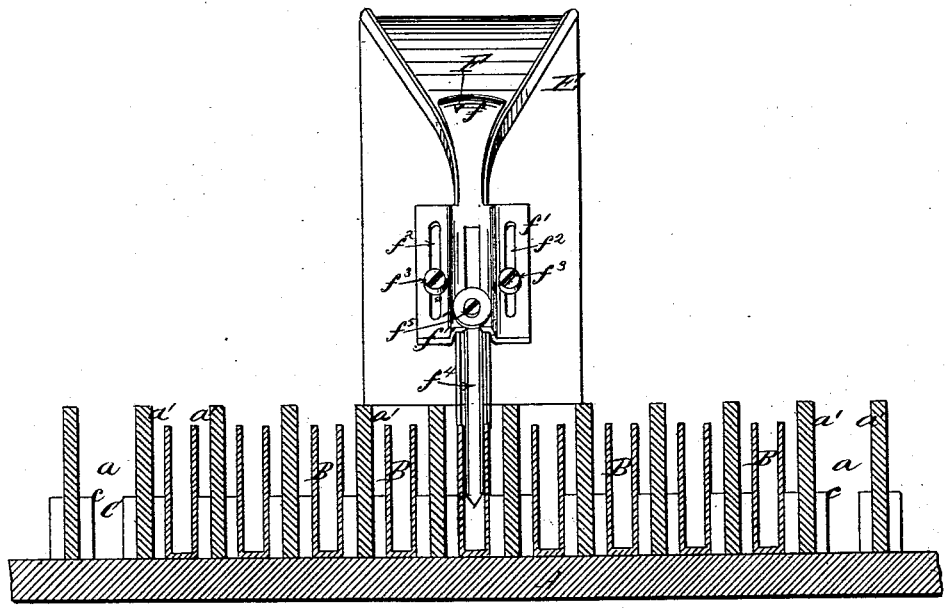

(No Model.) 5 Sheets—Sheet 1.
L. K. JOHNSON & A. A. LOW.
TYPE DISTRIBUTING APPARATUS.
No. 436,039. Patented Sept. 9, 1890.
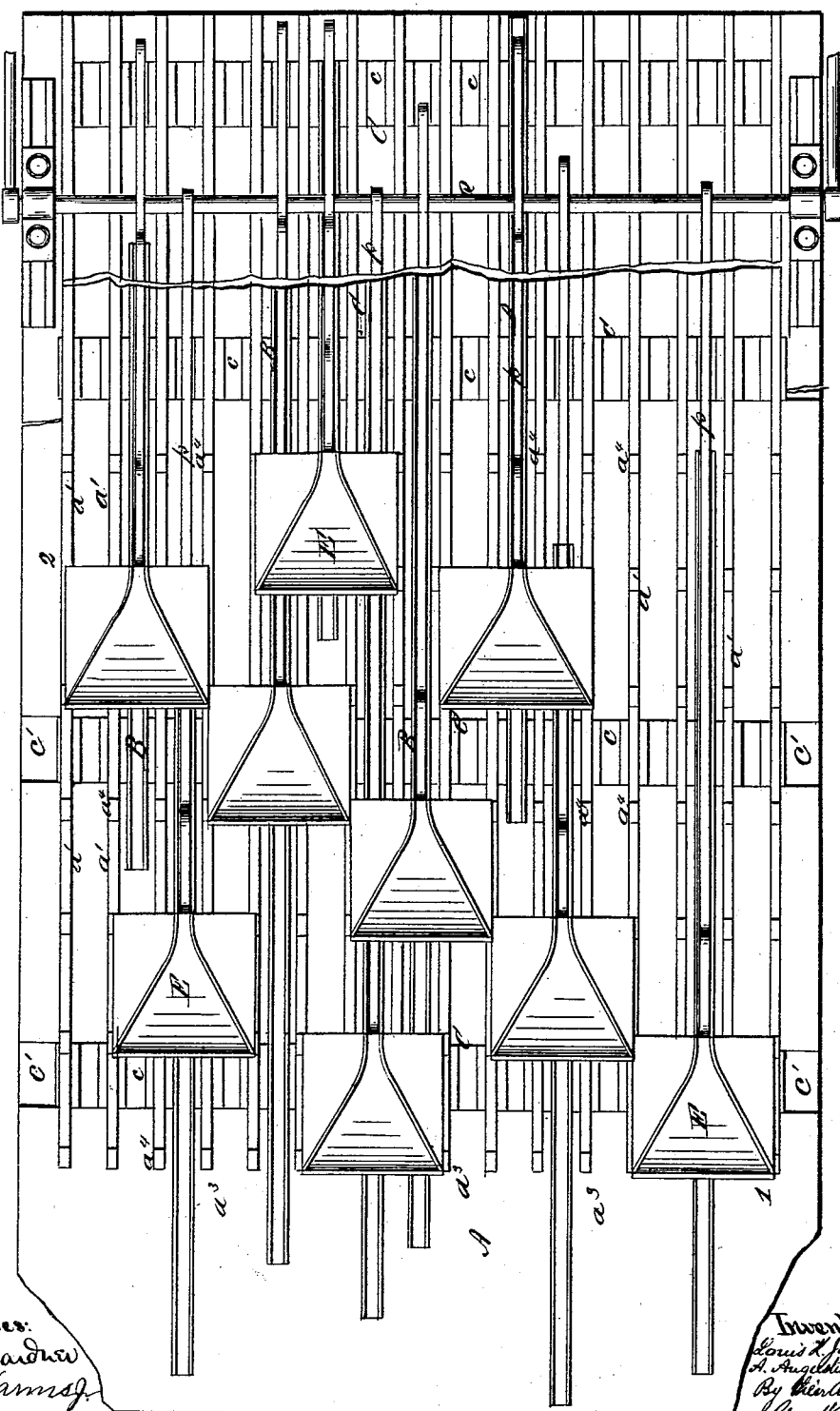

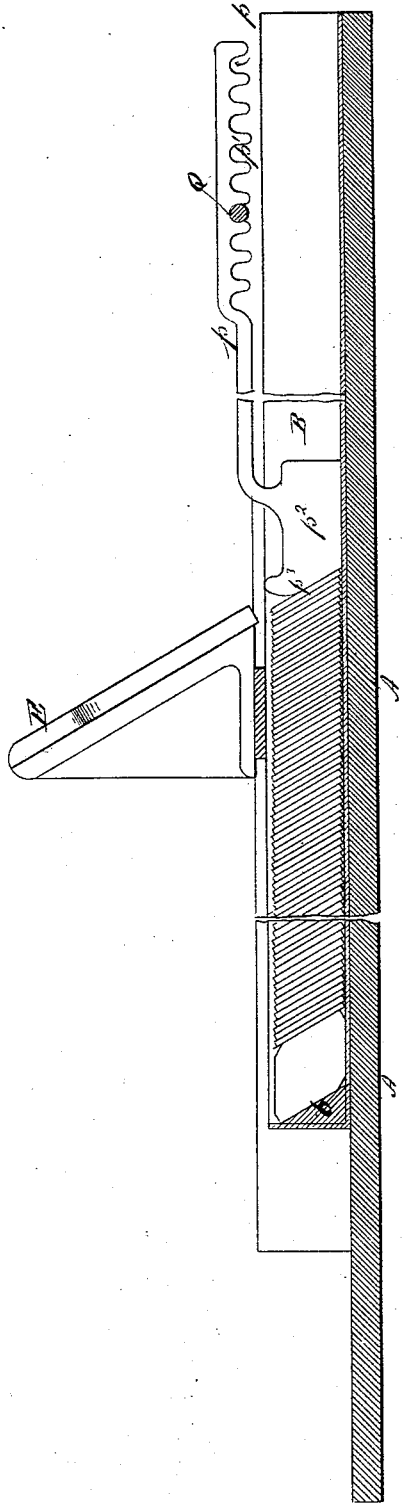

(No Model.) 5 Sheets—Sheet 3.
L. K. JOHNSON & A. A. LOW.
TYPE DISTRIBUTING APPARATUS.
No. 436,039. Patented Sept. 9, 1890.
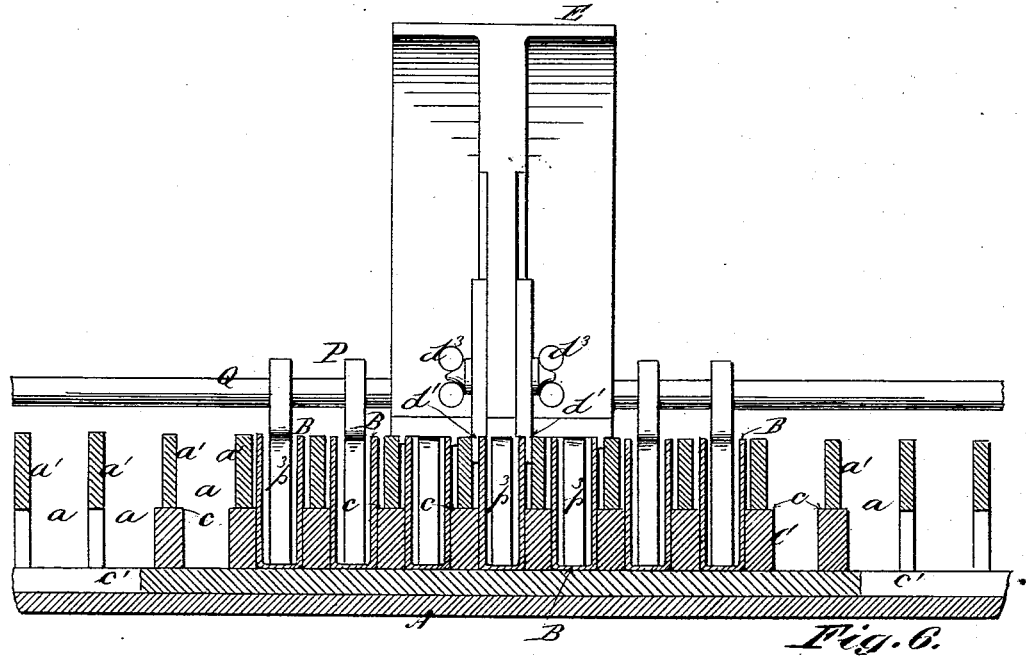
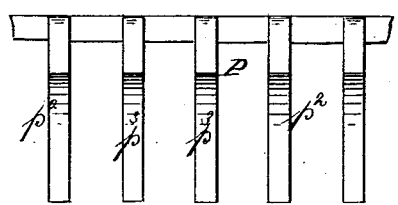
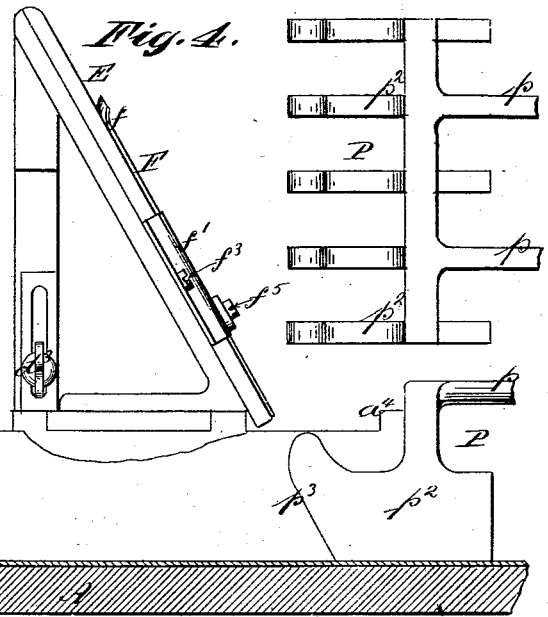

(No Model.) 5 Sheets—Sheet 4.

L. K. JOHNSON & A. A. LOW.
TYPE DISTRIBUTING APPARATUS.

No. 436,039. Patented Sept. 9, 1890.

Witnesses:
D. W. Gardner
H. H. Harms Jr.

Inventors:
Louis K. Johnson,
A. Augustus Low,
By their Attorney
Geo. W. Miatt (No Model.) 5 Sheets—Sheet 5.

L. K. JOHNSON & A. A. LOW.
TYPE DISTRIBUTING APPARATUS.

No. 436,039. Patented Sept. 9, 1890.

Witnesses:
D. W. Gardner
H. H. Harms Jr.

Inventors:
Louis K. Johnson
A. Augustus Low
By their attorney
Geo. W. Miatt

UNITED STATES PATENT OFFICE.

LOUIS K. JOHNSON AND ABBOT AUGUSTUS LOW, OF BROOKLYN, ASSIGNOR TO THE ALDEN TYPE MACHINE COMPANY, OF NEW YORK, N. Y.

TYPE-DISTRIBUTING APPARATUS.

SPECIFICATION forming part of Letters Patent No. 436,039, dated September 9, 1890.

Application filed September 22, 1887. Serial No. 250,460. (No model.)

*To all whom it may concern:*

Be it known that we, LOUIS K. JOHNSON and ABBOT AUGUSTUS LOW, citizens of the United States, residing in the city of Brooklyn, in the county of Kings and State of New York, have invented certain new and useful Improvements in Type-Distributing Apparatus, of which the following is a specification sufficient to enable others skilled in the art to which the invention appertains to make and use the same.

Our improvements relate to the distributing by hand of the types into type-containing channels, in which they are arranged in prescribed positions with relation to each other for use in the "setter."

In general design the main object is to effect such an independence and interchangeability of parts that the apparatus may be freely and conveniently modified and adapted to all possible conditions or requirements of practical use, to emancipate it, as it were, from the fixed unyielding rules of construction heretofore used, and to enable the user to exercise his individual judgment or preference as to method or arrangement. To this end the type-containing channels are all supported independently in separate grooves. The type-receivers are independent and interchangeable and may be adjusted to forward the types in the containing channels by hand, substantially as set forth in Letters Patent No. 336,836, issued to A. Augustus Low May 31, 1887, and the type-pushers provided for use when it is desired to use power are also independent and removable, so that certain of the type-containing channels may be provided with them, while others are furnished with the combined receiver and pusher above mentioned.

Where it is not convenient or desirable to use a continuously-reciprocating pushing mechanism operated by power, the independent pusher-bars referred to are removed and the receivers are arranged to forward as well as receive the types. To this end they are each provided with an adjustable tongue or pusher-finger, which may be either projected into the channels for use as a forwarder or withdrawn therefrom and held up out of the way when the positively-reciprocating forwarding mechanism is used. In the arrangement herein shown the types are forwarded from right to left, so that the pusher-fingers upon the receivers must necessarily extend downward in front of the last types deposited in the channels; but where the types are forwarded toward the right or to both the right and left, substantially as set forth in the Low patent hereinbefore referred to, the pusher-fingers will form continuations of the conduit-floors. There is, however, a decided advantage in the present construction, since the types not only descend and rest gently one over the other in a natural manner, but they are also protected and inclosed by the pusher-fingers, which keep the "throat" or receiving area in the channel free and unobstructed. A convenient means of forming these independent pusher-fingers upon the receivers is to provide the longitudinal guards upon the latter with adjustable extension-pieces, which may be held either extended or withdrawn from the channels by set-screws or other suitable means. In this connection our present construction includes the employment of suitable means for adjusting the said guard longitudinally with relation to the receiver-conduit for the purpose of increasing or diminishing the area of the type-receiving surface in the receiver above. It is to be understood that both the continuously-reciprocating pushers and the combined receivers may be advantageously used in the same apparatus, the latter being employed for the less frequently used denominations of types, while the power-pusher is used only for characters of most frequent occurrence in composition, thus avoiding unnecessary wear and complication.

A distinguishing feature of our present construction is the arrangement of the type-containing channels in independent grooves formed in or upon the supporting bed or table. Heretofore the containing-channels have usually been arranged side by side upon an ordinary flat table or surface with nothing intervening between them, and the type receivers and conduits have been supported upon transverse shelves or cross-bars extending the full width of the channel-bed. In the present case the type-containing channels are still arranged in parallel series; but they are separated by intervening stationary walls extending upward vertically from the channel-bed, which afford means both for centralizing the various sizes of channels to be used and for supporting the receivers independently. Besides the independent support rendered the separate receivers the intermediate stationary side walls referred to afford means for adjusting the said receivers longitudinally with relation to the type-containing channels.

The support and adjustment of the receivers upon the intermediate walls may be effected in various ways; but a simple and convenient manner of practically utilizing this feature of our invention consists in constructing said intermediate walls somewhat higher than the side walls of the containing-channels and in forming them with series of transverse notches or recesses, within any of which the bases of the receivers are adapted to rest. These recesses or notches are preferably arranged in coinciding series extending laterally across the apparatus, and are as numerous and close together as practicable. Their length is slightly greater than the corresponding width of the receiver-bases, in order to permit of the receivers being moved back and forth to the required extent when the pusher-fingers of the receivers are in use.

Our invention includes a series of interchangeable racks, which are employed to sustain and centralize the lower parts of the type-containing channels, thus adapting the grooves to type-containing channels of all sizes. We provide the receiver with laterally holding and centralizing shoulders which are independent of the receiver-conduit, and are rigid and adjustable and provided with one or more offsets corresponding to the different sizes of channels to be used.

Another feature of our special construction of parts consists in attaching the type-receivers and conduits to their bases or standards by means of shoulders or tenons formed upon the under side of the receiver and conduit, which enter and engage correspondingly-formed slots or recesses in the front plate of the base-piece or frame.

Finally, our invention embodies an entirely new and original method of treating the types during distribution. Heretofore the types have always been deposited and forwarded in stationary type-containing channels, the forward ends of the lines or columns being supported by movable slugs or type-preceders, and a whole line or column in a channel being moved as fast as types were added in the rear, thus creating constant friction and wear between the types and type-containing channels. By our improved method wear upon the types is largely avoided, since the types are, in effect, stationary in the type-containing channels immediately after being deposited therein. This feature of our invention consists, essentially, in the combination, with suitable means for depositing the types in a containing-channel and with suitable type-forwarding mechanism, of a type-containing channel closed at one end, or otherwise provided with a stationary type-supporting shoulder or surface, against which the types are pressed by the pusher or forwarder in such manner as to cause the type-containing channel to recede in a longitudinal direction. There are other practical advantages attending this method of distributing the types into movable channels instead of moving the types themselves aside from the avoidance of wear upon the types. Each channel recedes only in proportion to the number of types deposited in it, and consequently those most rapidly filled project beyond those adjoining sufficiently to attract attention and to facilitate their removal. It will be noticed that all the parts of the apparatus—receivers, pushers, channels, and all—are readily removable and interchangeable, simply resting in their places without any positive fastenings; also, that the whole or any portion of the apparatus may be used as required with equal facility.

In the accompanying drawings we have illustrated practicable means for carrying out and giving effect to the essential features of our improvements, although we do not desire to confine ourselves strictly to the identical form and construction of parts shown, since it is obvious that various modifications may be made without deviating materially from the spirit and intent of our invention.

Figure 9:
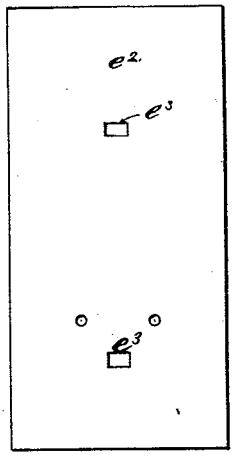
Figure 8:
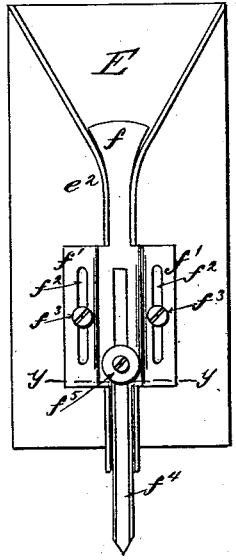
Figure 10:
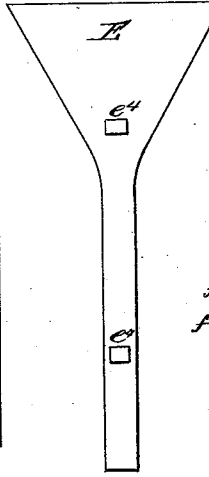
Figure 11:
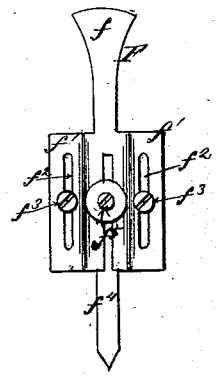
Figure 14:
Figure 12:
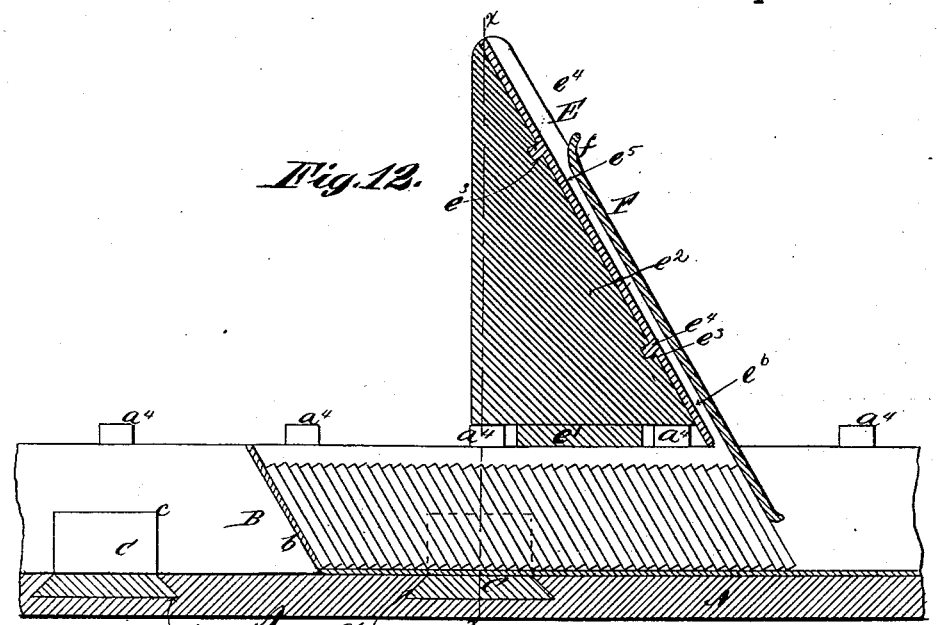
Figure 13:
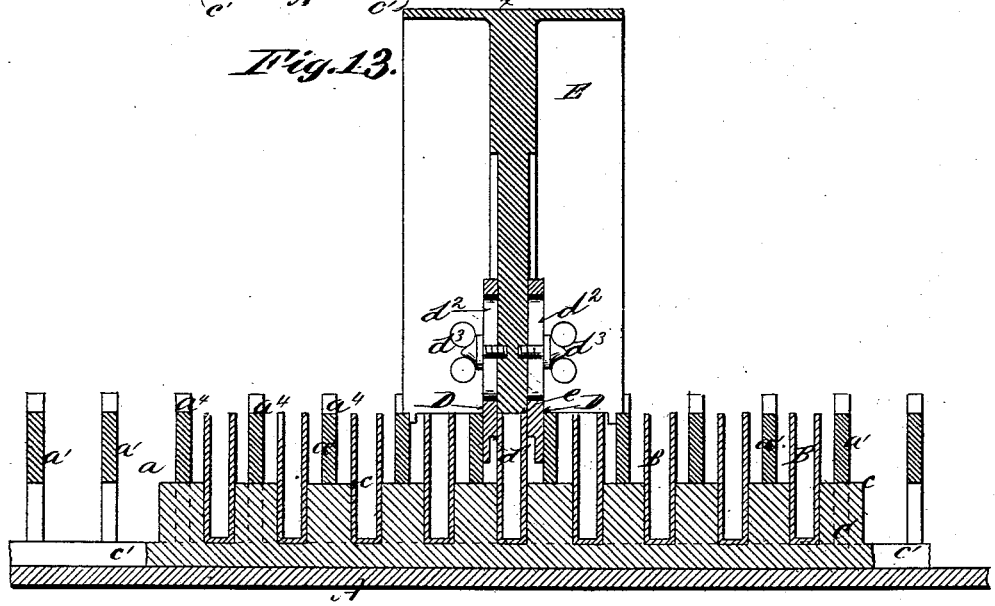

Figure 1 is a plan illustrating the arrangement of an apparatus embodying our improvements, a portion of the channel-bed being broken away; Fig. 2, a vertical longitudinal section through one of the type-containing channels, type-receivers, &c., portions of the apparatus being shown as broken away; Fig. 3, a transverse section of a portion of the channel-supporting bed, &c., showing a rear elevation of one of the type-receivers; Fig. 4, a longitudinal elevation through a portion of a type-containing channel and adjoining parts, showing a side elevation of one of the type-receivers and of one of the reciprocating pusher-heads; Fig. 5, an end elevation of a series of pusher-heads united together; Fig. 6, a plan of the same. Fig. 7 is a vertical transverse section of a portion of the type-channel bed, &c., showing a front elevation of one of the type-receivers and conduits provided with a type-forwarding finger. Fig. 8 is a front elevation of a type-receiver and conduit so provided, taken upon a plane parallel to the inclined face of the supporting bracket or frame. Fig. 9 is a similar view with the longitudinal guard and receiver and conduit removed; Fig. 10, an elevation of the rear side of the receiver and conduit; Fig. 11, a front view of the longitudinal guard and type-forwarding finger removed; Fig. 12, a vertical longitudinal section of a portion of a type-containing channel and a type-receiver and conduit, showing the extension of the longitudinal guard arranged to forward the types; Fig. 13, a transverse section through a portion of the type-conduit bed, &c., upon plane of line $x\ x$, Fig. 12. Fig. 14 is a transverse section of the longitudinal guard upon plane of line $y\ y$, Fig. 8.

The type-channel bed or table A is supported upon a frame or standard in the usual manner. It is of a length about equal to twice the length of the channels to be used, in order to afford continuous support for the type-containing channels as they recede under the action of the forwarding mechanism. Running lengthwise of the table A are the type-channel grooves $a$, one or both of the parallel side walls $a'\ a'$ of which extend up vertically a distance slightly greater than the height of the side walls of the type-containing channels B. At suitable intervals transverse racks C are introduced across the type-channel-supporting table, formed with notches or recesses $c\ c$, corresponding in width to the thickness of the type-containing channels to be used. These racks support the lower portions of the type-containing channels laterally, and separate racks are used for each size of channel. The base-plate racks slide into dovetail or other suitable grooves $c'\ c'$ formed in the channel-supporting bed A, and the side walls $a'$ of the channel-grooves $a$ are recessed to receive the rack.

In Fig. 3 comparatively wide type-containing channels are shown in conjunction with a rack correspondingly formed to receive them, while in Figs. 7 and 13 channels of less width are shown as supported in like manner by racks formed with narrow notches. The type-containing channels B are supported laterally from above by means of rigid embracer or shoulder pieces D D, which are attached to the bases or frames of the receivers. These embracers D D are preferably formed with one or more offsets or shoulders $d'\ d'$, adapted to engage type-containing channels of different widths, and when so made are attached to their support in such manner as to be adjustable vertically in order to adapt them to engagement with the different widths of channels. In Fig. 3 they are shown as adjusted to engage the upper side walls of type-containing channels of maximum width, while in Fig. 13 they are shown as lowered into position to embrace the side walls of the lower channels. The vertical adjustment of these embracers D D may be effected in any desired manner. As shown in the drawings, they are secured to the receiver E and slots $d^2\ d^2$, through which the set-screws $d^3\ d^3$ pass. It will be noticed that they fit snugly into the grooves $a$ and against the inner side walls $a'$ of the latter, so that they not only serve to hold and centralize the type-containing channels B, but also to centralize and hold the receivers E and insure the proper relation between the latter and the type-containing channels B. The parallel side walls $a'$ of the grooves $a$ preferably end a short distance from the rear or left end of the table or bed A in order to afford a sufficient space $a^3$ for the convenient handling and removal of the channels as they become filled. The upper edges of the side walls $a'$ of the grooves $a$ are formed with shoulders $a^4$ for the reception and retention of the bases $e'$ of the receivers E. These shoulders extend down to a level with the upper edges of the channels, or nearly so, and, if preferred, need only be formed in alternate side walls, the others being low walls not extending at any point above the upper edges of the type-containing channels, and thus affording more convenient access to the latter and their contents, if necessary, while in the grooves. The recesses between the shoulders $a^4$ are preferably made of greater length than the width of the base of a receiver E in order to allow the latter a sufficient degree of play or reciprocal movement when used both to receive and forward the types, as illustrated in Fig. 12, the weight of the receivers E being sufficient to retain them in position when not so used, since they are not subjected to any strain or pressure by the action of the independent positively-reciprocating pusher P. The notches or recesses $a$ are preferably arranged to coincide with each other in transverse rows or series, as shown in Fig. 1, and a receiver E may thus be arranged in any position desired, either laterally or longitudinally, to act in conjunction with any one of the series of type-containing channels B. Thus they may be arranged in diagonal rows, as shown between 1 and 2, Fig. 1, or at any convenient or intermediate position, as indicated by the other holders in the said Fig. 1. In practice their arrangement diagonally is convenient, since it follows the natural movement of the right hand during distribution.

The inclined front plate $e^2$ of each receiver E is formed with notches or recesses $e^3\ e^3$, which receive and hold the lugs $e^4\ e^4$, formed upon the under side of the receiver and conduit-plate $e$, so that the latter has simply to be dropped into place upon its frame or support.

The upper end $f$ of the longitudinal guard F is fan-shaped to cover the lower portion of the receiver-cup $e^5$, and is made adjustable longitudinally with relation to the conduit $e^6$. This adjustment may be effected by any appropriate means other than the identical form shown in the drawings, in which the lateral lugs $f'\ f'$ are formed with longitudinal slots $f^2\ f^2$, through which the set-screws $f^3\ f^3$ pass in order to secure the guard in the desired position upon the inclined plate $e^2$ of the receiver E. The guard F is formed with an extension-piece $f^4$, which is adapted to be projected into or withdrawn entirely from the type-containing channel. When it is desired to use the receiver E as a pusher and to dispense with the positively-reciprocating pusher P, the extension-piece $f^4$ is lowered into substantially the position shown in Figs. 7 and 8 and secured rigidly in such position by suitable means. This may be accomplished by dovetailing the extension-piece $f^4$ to the guard, as shown, and by holding it in the required position, either up or down, by means of a set-screw $f^5$, or the same result may be effected by any other suitable or well-known means, the essential feature of our invention in this connection being a pusher-finger extending downward from the receiver E in front of the types and adapted to forward them toward the left hand or direction opposite to that in which they descend. This is a new and important feature of construction in connection with the use of the device E as a combined receiver and forwarder, since such combined receivers and forwarders have heretofore always been arranged to forward the types in the direction in which they descended into the type-containing channels. The type-containing channels B are either closed at the end or formed with a transverse partition or shoulder $b$ in any suitable or convenient manner to afford a support for the ends of the type-lines. In this connection the notched type-containing channel provided with movable partitions (shown and described in Letters Patent No. 360,355, issued to A. Augustus Low) may be advantageously used. The positive pushers when used are simply placed in a containing-channel and their shanks connected to the horizontally-reciprocating cross-rod Q, which latter may be actuated by any convenient or desirable means, so well-known and obvious that it is not deemed necessary to illustrate them here.

The means for securing the pushers P to the reciprocating cross-rod Q may be varied; but for convenience and rapid adjustment the method shown in the drawings is desirable. The shanks $p$ are formed upon their under sides with a series of notches $p'$, any of which will engage the cross-rod Q, and the degree of forward projection of the pusher P may be thus varied to accommodate it to the position of a particular receiver E. It will be seen that the heads $p^2$ of the pushers P are comparatively large and that their type-bearing surfaces $p^3$ are substantially "type-high," thus affording a firm and substantial support for the types as they are being forwarded. If preferred, the pushers may be combined together in series, as indicated in Figs. 5 and 6, although in an apparatus of this character, in which we design to simultaneously use both the pushers P and the forwarding-fingers $f^4$, as hereinbefore indicated, the freer and more independent all parts are the more perfect will be its adaptability to use under the varying requirements of distribution.

In our concurrent application, No. 330,155, filed November 13, 1889, which is a subdivision of the present application, are shown certain features of construction which are common with the present case, and we hereby disclaim the features claimed specifically in said application No. 330,155.

What we claim as our invention, and desire to secure by Letters Patent, is—

1. In a type-distributing apparatus substantially such as described, the combination, with suitable type receiving and depositing mechanism, and with suitable type-forwarding mechanism, of a type-containing channel provided with a fixed type-shoulder and adapted to move longitudinally, substantially in the manner and for the purpose described.

2. In a type-distributing apparatus substantially such as described, the combination and arrangement, substantially as herein shown and described, with a series of type receivers and conduits, and with mechanism for forwarding the types, of a series of type-containing channels formed with fixed type-supporting shoulders and adapted to be moved independently and longitudinally, substantially in the manner and for the purpose described.

3. In a type-distributing apparatus substantially such as described, the combination, with a series of type-containing channels, and with a series of independent interchangeable type-receivers and conduits, substantially as described, of a series of grooves for the reception of the said type-containing channels, the side walls of the said grooves being adapted to receive and support the said receivers and conduits independent of the type-containing channels, substantially in the manner and for the purpose described.

4. In a type-distributing apparatus substantially such as described, the combination of a series of type-containing channels, a series of independent interchangeable type-receivers and conduits, and a bed or support formed with a series of parallel grooves for the reception of the said type-containing channels, the side walls of the said grooves being formed with shoulders which hold the said receivers and conduits in position, substantially in the manner and for the purpose described.

5. In a type-distributing apparatus substantially such as described, the combination, with a type-containing channel, and with the side walls of a groove in which the said type-channel rests, of a type-receiver and conduit formed with projecting shoulders which bear against both interior side walls of the said grooves and the exterior side walls of the said channels, for the purpose and substantially in the manner described.

6. In a type-distributing apparatus substantially such as described, the combination, with two or more series of type-containing channels of different widths, and with the side walls of a series of grooves for the reception of the said type-containing channels, of a series of type-receivers and conduits formed with projecting shoulders which fit between the inner side walls of the said grooves and the outer side walls of the said channels and are adapted to engage type-containing channels of different width, substantially in the manner and for the purpose described.

7. A type-receiver and conduit provided with shoulders or projections which are formed to engage with the exterior sides of type-containing channels of different widths, in combination with the latter, for the purpose and substantially in the manner described.

8. In a type-distributing apparatus substantially such as described, the combination, with type-containing channels of different width, with the side walls of a groove for the reception of the said channels, with a type-receiver and conduit formed with projecting shoulders which fit between the said side walls of the groove, and offsets for engaging and holding the exterior walls of type-containing channels of different widths, of means, substantially such as described, for adjusting the said projecting shoulder vertically, for the purpose and substantially in the manner described.

9. In a type-distributing apparatus substantially such as described, a type-receiver and conduit provided at its rear side with the vertical shoulder-pieces D, formed with the offsets $d'$ $d'$ and vertical slots $d^2$ $d^2$ and secured to the said type-receiver and conduit E by the adjusting-screws $d^3$ $d^3$, substantially in the manner and for the purpose described.

10. In a type-distributing apparatus substantially such as described, a receiver and conduit-plate E, formed with shoulders $e^4$ $e^4$ upon its under side, in combination with the supporting-plate $e^2$, formed with the mortises $e^3$, for the purpose and substantially in the manner described.

11. In a type-distributing apparatus substantially such as described, the combination, with the receiver and conduit, of the longitudinal guard F, formed at its upper extremity with the fan-shaped type-guiding surface $f$, substantially in the manner and for the purpose described.

12. In a type-distributing apparatus substantially such as described, the combination, with a receiver and conduit, of an elongated type-guard which is adjustable longitudinally with relation to the conduit, substantially in the manner and for the purpose described.

13. In a type-distributing apparatus substantially such as described, the combination, with a receiver and conduit and with a type-containing channel, of a longitudinal guard which extends into the type-containing channel, for the purpose and substantially in the manner described.

14. In a type-distributing apparatus substantially such as described, the combination, with a type-receiver and conduit and with a type-containing channel, of a longitudinal guard provided with an extension-piece which is adapted to be projected into or withdrawn from the said type-containing channel, substantially in the manner and for the purpose described.

15. In a type-distributing apparatus substantially such as described, a receiver and conduit, and a guard F, formed with a longitudinal groove for the reception of an adjustable extension-piece $f^4$, in combination with said adjustable extension-piece $f^4$, provided with a set-screw $f^5$, for the purpose and substantially in the manner described.

16. In a type-distributing apparatus substantially such as described, the combination, with a type-containing channel, of a type-receiver and conduit formed with a guard or extension which projects into the type-containing channels in front of the types, substantially in the manner and for the purpose described.

17. In a type-distributing apparatus substantially such as described, the combination of a series of type-containing channels, a bed or support therefor formed with a series of grooves of greater width than the type-containing channels and a series of transverse racks for holding the said channels, substantially in the manner and for the purpose set forth.

LOUIS K. JOHNSON.
A. AUGUSTUS LOW.

Witnesses:
D. W. GARDNER,
GEO. W. MIATT.